J. BECKER.
TRANSMISSION GEAR FOR MILLING AND OTHER MACHINES.
APPLICATION FILED DEC. 12, 1908.

1,082,994.                        Patented Dec. 30, 1913.

J. BECKER.
TRANSMISSION GEAR FOR MILLING AND OTHER MACHINES.
APPLICATION FILED DEC. 12, 1908.

1,082,994.

Patented Dec. 30, 1913.

4 SHEETS—SHEET 3.

Witnesses:
Edwin T. Luck
Robert H. Kammler.

Inventor:
John Becker,
by Emery & Booth
Attys.

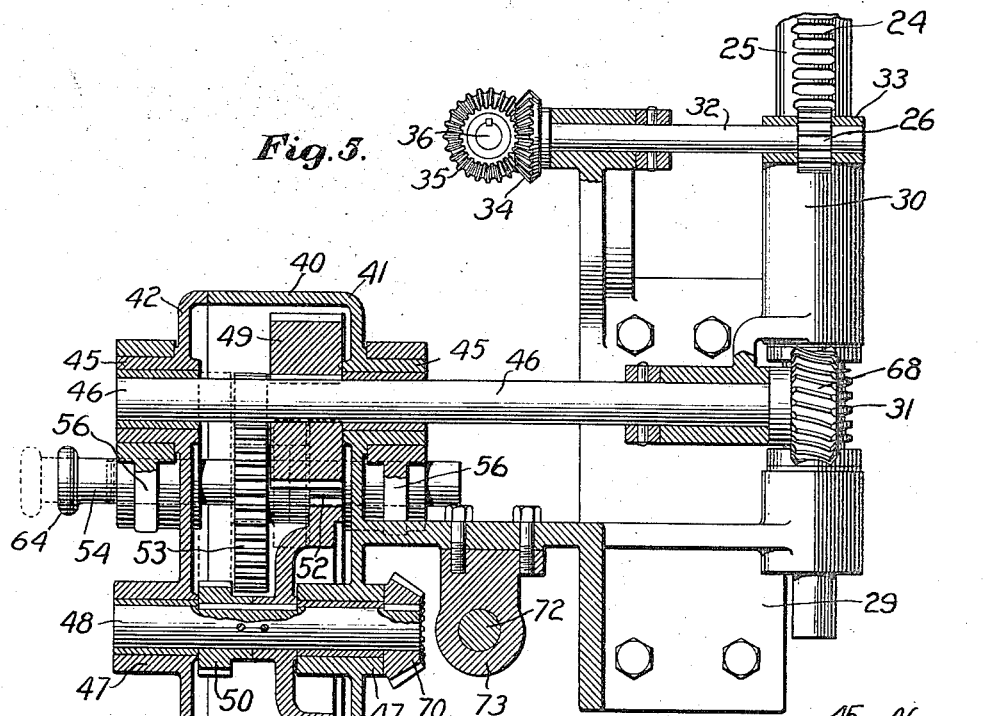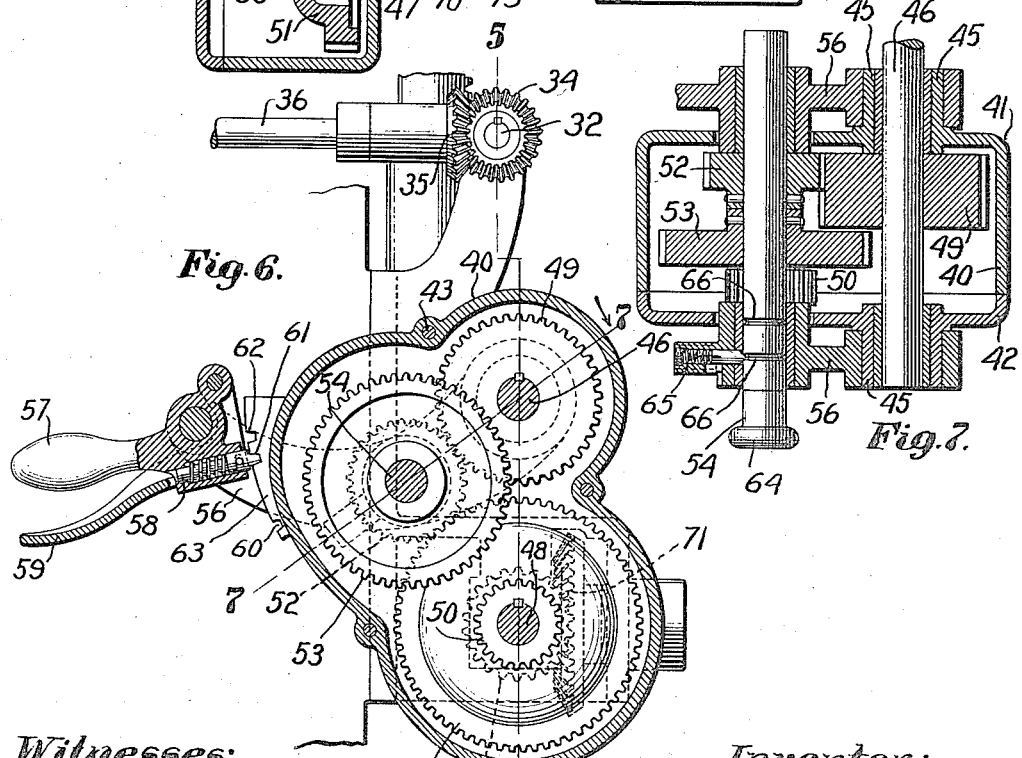

UNITED STATES PATENT OFFICE.

JOHN BECKER, OF HYDE PARK, MASSACHUSETTS, ASSIGNOR TO BECKER MILLING MACHINE COMPANY, OF PORTLAND, MAINE, A CORPORATION OF MAINE.

TRANSMISSION-GEAR FOR MILLING AND OTHER MACHINES.

1,082,994. Specification of Letters Patent. Patented Dec. 30, 1913.

Application filed December 12, 1908. Serial No. 467,146.

*To all whom it may concern:*

Be it known that I, JOHN BECKER, a citizen of the United States, and a resident of Hyde Park, in the county of Norfolk and Commonwealth of Massachusetts, have invented an Improvement in Transmission-Gear for Milling and other Machines, of which the following description, in connection with the accompanying drawings, is a specification, like letters on the drawings representing like parts.

My invention aims to provide novel transmission or driving mechanisms suitable for milling and other machines, and to enable my invention to be understood I have herein elected to disclose the same as embodied in a milling machine of the vertical type.

My invention may be readily understood by reference to the following description and the accompanying drawings, wherein—

Figure 1:
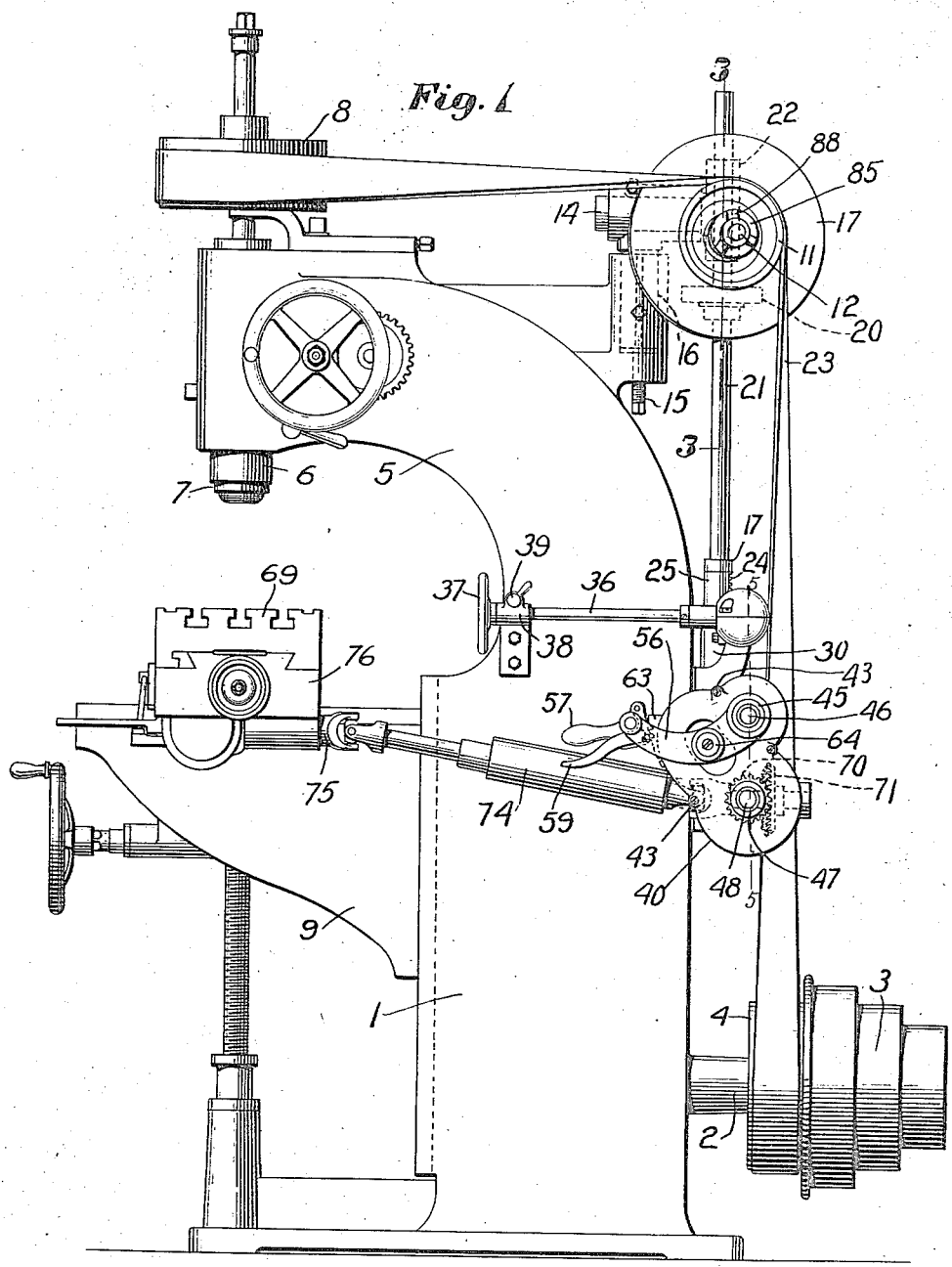
Figure 2:
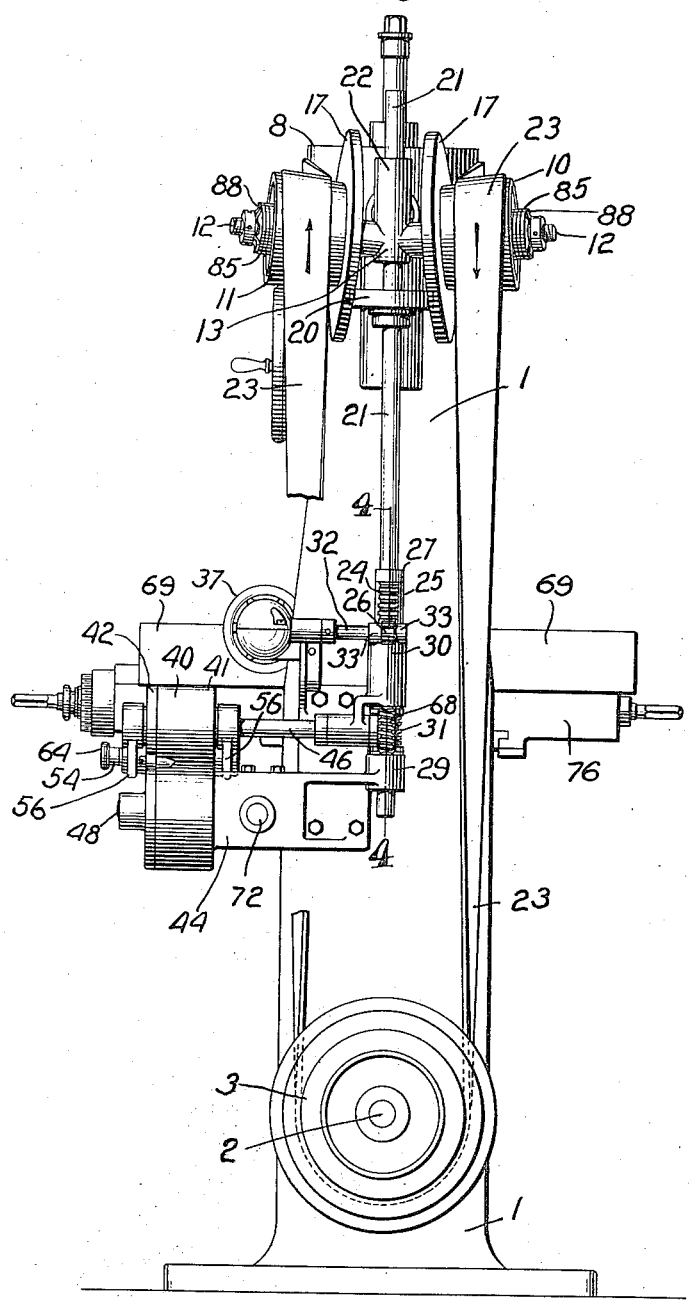
Figure 3:
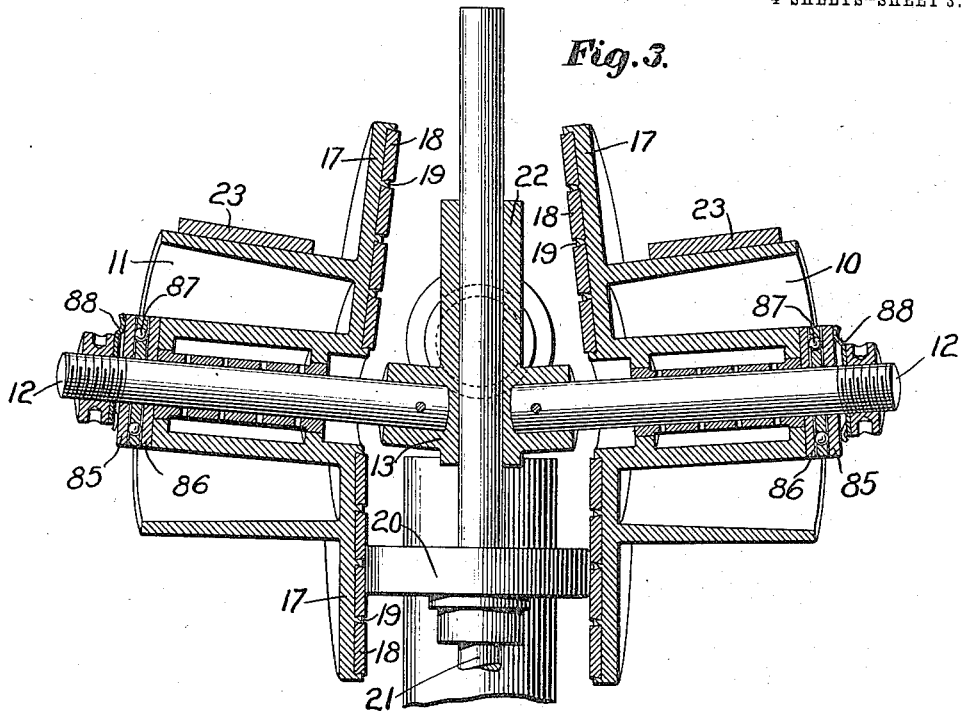
Figure 4:
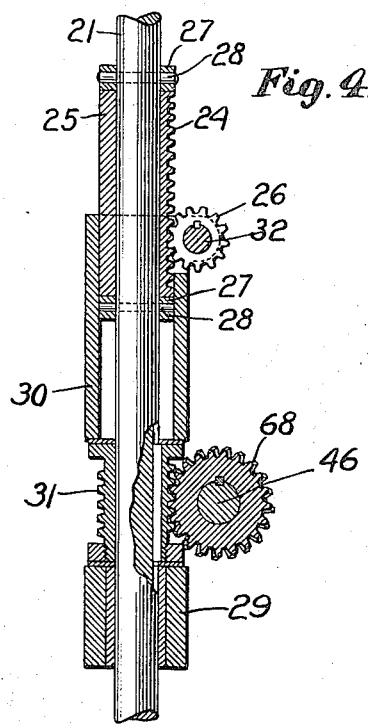

Figure 1 is a side elevation showing a vertical milling machine equipped with one embodiment of my invention; Fig. 2 is a rear view of Fig. 1; Fig. 3 is an enlarged sectional detail on the line 3—3 of Fig. 1; Fig. 4 is an enlarged sectional detail on the dotted line 4—4, Fig. 2, showing adjusting means for the mechanism shown in Fig. 3; Fig. 5 is a sectional view taken on the line 5—5, Fig. 1, showing a tumbler gear mechanism combining features of my invention; Fig. 6 is a view of the tumbler gear mechanism from the left of Fig. 5 with the cover of the gear case removed; and Fig. 7 is a sectional detail taken on the diagonal line 7—7, Fig. 6.

In the drawings, referring to Fig. 1, the vertical milling machine 1 is employed as illustrating any machine to which my invention is adapted, said machine herein being provided with a horizontal stud shaft 2, upon which are mounted the stepped driving pulleys 3 and the main transmission pulley 4. Said machine comprises an overhanging arm 5 having mounted therein the vertical spindle 6 having a suitable chuck 7 at its lower end to receive a tool and a driven pulley 8 at the upper end thereof. The work is supported by the vertically adjustable knee 9 having a tongue and groove connection with the body of the machine.

My transmission mechanism utilizes power from the lead pulley or idler formerly used in machines merely to guide the belt from the main drive shaft to the pulley on the driven spindle. This power may be employed to drive the work table feed or to drive any parts or elements of the machine coöperating with the tool carried by the spindle. The power on the tool and the power on the feed or said elements will thus be dependent on and proportioned to each other. The use of a belt and pulley guide is preferable to a chain of toothed gears since the objectionable back lash occurring where a chain of toothed gears is employed between the spindle and work guide is eliminated.

I will now proceed to describe the structure of the guide or lead pulleys and the connections therewith by which the idle pulley of former machines is utilized as a driving means.

The guide pulleys 10 and 11 are similar in construction and a description of one will suffice for both. Said pulleys are mounted loosely upon laterally and slightly upwardly extending studs 12 (Fig. 3) and are secured at their inner adjacent ends in a socketed bearing support 13, which is adjustably held in the split socket 14 on the upper end of a vertical arm 15, which in turn is vertically adjustable in an extension 16 herein integral with the machine frame.

The lead pulleys 10 and 11 are each provided at their inner adjacent ends with disk-like faces 17 fitted with concentric rings 18 of leather or other friction material held between annular dove-tailed ribs 19. Between the friction disks 17 and herein below the stud support 13 upon which the pulleys are mounted, is arranged a driven wheel or transmission member 20. This wheel may be conveniently of metal and with a smooth and preferably cylindrical metal periphery, said wheel in the present instance being fast on a vertical shaft 21 journaled at its upper end in a bearing 22 integral with said stud bearing 13. The diameter of the driven disk 20 is such as preferably to extend from one to another of the friction disks 17, which are thereby permitted to bear frictionally upon and at diametrically opposite points of said frictionally driven wheel 20.

When the machine is in operation the driving belt 23 in transmitting motion from the drive pulley 4 to the vertical spindle 6 imparts opposite rotation to the lead pulleys 10 and 11, thereby constituting said lead pulleys driving pulleys or wheels for the transmission of power to the mechanism connecting with the work feed or other parts of the machine desired to be operated. Since the disks are rotated in opposite directions and since they bear upon the driven disk 20, the shaft 21 will be rotated to transmit motion as desired.

It is a well-known mechanical fact that a moving belt passing over the periphery of a pulley tends constantly to creep toward the highest or largest diameter of said pulley. In the structure herein shown the belt pulley is guided by the drive pulley 4 and the spindle pulley 8 and therefore tends to assume a constant line of travel, but the pulleys 10 and 11 being free to slide on the stud shafts 12 will be moved toward each other by the effort of the belt to move toward the highest point of the pulley and cause the friction disks 17 to be constantly pressed into frictional engagement with the driven wheel or element 20 and it follows that the greater the load imposed upon the spindle 6 and its pulley 8, the greater will be the effort required on the part of the belt 23 to rotate the same and the greater the action upon the lead pulleys 10 and 11 to draw the same toward each other to press on the disk 20 and consequently the greater will be the power transmitted to and through said driven wheel. If the power from the driven shaft 21 be connected to operate a work table or any other part of the machine coöperating with the tool upon the vertical spindle 6, it will be apparent that the power transmitted thereto will be directly proportioned to that required for operating the tool itself. Additional friction of the disks 17 against the driven disks 20 may be obtained by the washers 85 and 86 between which are arranged suitable anti-friction devices, such as ordinary balls 87 spaced in desired manner. The outermost washers 85 are pressed upon by spiderlike springs 88 which may be adjusted by nuts having a threaded engagement with the outer end of the stud shaft 12. The stud shafts 12 being inclined vertically the friction disks 17 are shown as cupped sufficiently to cause portions thereof from the stud shafts downwardly to stand in substantially parallel lines of contact with the driven wheel 20.

While a belt 23 has been shown herein as the mode of transmission between the driving pulley 4 and the driven pulley 8 my invention comprehends any type of transmission or driving gear aiming toward the same result.

Certain kinds of metal and certain types of work may be treated more rapidly than others. Feed variations are also frequently necessary in operating on one piece of work. It is therefore desirable to have a wide and nice adjustment of the work feed. The speed of the motion transmitted from the disk 17 through the driven disk 20 may be varied by adjusting the vertical shaft 21 and the driven disk 20 toward and from the axes of the stud shafts. This adjustment (Figs. 1, 2, 4 and 5) may be readily effected by a rack 24 in a sleeve 25 on said vertical shaft. The rack 24 herein is provided with submerged teeth extending along the length of a groove in a sleeve 25 and preferably the ends of the teeth are flush with the outer periphery of said sleeve, the sides of the teeth of pinion 26 engaging the sides of said groove to prevent rotation of said sleeve. The shaft 21 and the sleeve 25 are connected to move longitudinally together by collars 27 spaced to receive said sleeve therebetween and fixed to said shaft by pins 28.

The above described friction transmission mechanism is disclosed and claimed in U. S. Letters Patent No. 941,402 granted to me Nov. 30, 1909, on an application pending concurrently herewith. In the present instance said friction variable speed transmission mechanism is employed to govern the movement of the work or work table relative to the milling or other tool upon the vertical carrying spindle 6. To this end the vertical shaft 21 is supported at its lower end in a bracket bearing 29 bolted to the machine frame. Above said bearing 29 is a bracket bearing 30 having an enlarged bore to receive the rack sleeve 25, hereinbefore referred to and whereby said sleeve may slide vertically when adjusted as described.

Between the bearing brackets 29 and 30 is arranged a worm 31, splined upon said shaft 21 to permit the latter to slide therethrough. To bring control of the vertical adjustment of the shaft 21 within easy reach of the operative, the rack adjusting pinion 26 referred to is mounted on a cross shaft 32 (see Figs. 2 and 5) supported at one end in an ordinary bearing, and at the other end in ears 33 integral with said bearing 30 and spaced to receive said rack adjusting pinion 26 therebetween. Said shaft may be operated by bevel gears 34 and 35 from a forwardly extending shaft 36, mounted in suitable bearings and carrying at its front end a hand wheel 37. The rack pinion 26 and the vertical shaft 21 controlled thereby may be held in desired positions of adjustment by the split front bearing 38 of said shaft 36 and the tightening screw 39. By the above described friction gears the speed of the work table can be varied gradually or rapidly without stopping the machine by simply operating the said hand wheel 37 to adjust the driven disk 20 along the faces of the drive disks 17.

To increase the limits of the speed variations obtained by the friction drive mechanism, a change speed tumbler mechanism is herein interposed between said friction drive and the work feed. Said tumbler gear mechanism may be constructed to furnish any desired number of fixed speeds, herein two speeds are obtained, which may be of sufficient difference to permit the friction gears to be adjusted to produce gradual gradations of speed variation higher and lower than each fixed speed as a nucleus without one field of speed variation overlapping the other. Referring more particularly to Figs. 5, 6, and 7, I will describe a convenient form of tumbler gear mechanism for this purpose. Said mechanism is herein shown inclosed by a casing 40, Figs. 1 and 5, having a curved contour and comprising a cup-like portion 41 and a cover 42 removably attached thereto by suitable bolts 43. Said casing may be attached to the machine frame by an arm 44 extending from the base of said cup 41 and forming a part of the bearing bracket 29. This casing may be provided with oppositely extending end bosses 45 which form bearings for a drive shaft 46. Said casing may be provided with a second similar lower set of outwardly extended bosses 47 to form bearings for a driven or change gear shaft 48. Fixed on said drive shaft 46 within said casing 40 is a wide drive gear 49 and fixed or suitably attached to the driven shaft 48 within said casing 40 are a plurality of driven or change gears. Herein two such gears are shown, a pinion 50 and a gear 51. Power may be transmitted from the drive gear 49 to the driven or change gears 50 and 51 at a plurality of speeds through the tumbler pinion 52 and gear 53 located within the casing on a tumbler shaft 54, the ends of the latter projecting through elongated openings in said casing, and supported outside thereof in bosses in arms or carriers 56 mounted to swing on said bosses 45. I will now describe the adjustment of the tumbler gear shaft 54 relative to the drive shaft 46 and the driven shaft 48 to transmit varying speeds from one of said shafts to the other. The smaller tumbler pinion 52 is always in mesh with the wide drive gear 49 since the arms 46 swing about the axis of the shaft 46 carrying said gear 49. One speed may be obtained when the tumbler pinion 52 is in mesh with the drive gear 49 and the change gear 51. A second speed may be obtained by sliding the tumbler shaft 54 longitudinally to draw the tumbler pinion 52 out of mesh with the driven or change gear 51, but said pinion 52 will still be in mesh with the wide drive gear 49. The tumbler gear 53 will now be opposite the driven pinion 50. Said gear and pinion may then be brought into meshing position by lowering said tumbler shaft. The tumbler gear shaft may be moved radially by its said arms 56 about the shaft 46 to adjust the tumbler gear shaft 54 relative to said driven shaft 48 to throw the tumbler gear 53 in and out of mesh with the driven pinion 50 by a handle 57 extending from one of said arms 56 and said shaft 54 may be held in any adjusted position by a latch 58 operated by a latch handle 59, said latch engaging the spaced, tapered notches 60, 61 and 62 in a segment 63 extending from the casing 40. Ends of the arms 56 carrying the tumbler shaft 54 are fulcrumed in the bosses 45 and other ends are held by the latched handle 59. The tumbler shaft 54 is supported at a point on each arm between its fulcrum and handle, thus rigidly holding said shaft with advantageous leverage up to and in mesh with the driving and driven gears.

The tumbler gears 52 and 53 together with their shaft 54 slide longitudinally to bring said gears opposite to and in the plane of the gears with which they are to connect, and this may conveniently be accomplished in any desired manner, as by pushing the end of said shaft 54 with knob 64 into the full and dotted line position shown in Fig. 5. Said shaft 54 may be held in its adjusted position by a spring pressed double tapered latch 65 recessed into the tumbler gear shaft bearing and engaging double tapered peripheral grooves 66 in the tumbler shaft 54. The strength of the latch spring is sufficient to prevent longitudinal movement of said shaft when adjusted, but the tapered or cam surfaces of the grooves and latch cause said spring and latch to yield when the shaft is thrust in or out by the knob 64.

The tumbler gears 52 and 53 are mounted fast on the tumbler shaft 54 and rotate and slide therewith. The tumbler shaft bearings are spaced a substantial distance, so that the long length of the shaft between bearings instead of merely the short length of the tumbler gear hub, resists any tendency of the tumbler gears to work or wear loose and move out of their proper position.

In the present construction the bearings of the tumbler gear shaft are readily accessible and the necessity for a complex oiling and gear sliding mechanism is eliminated.

Power may be transmitted from the vertical drive shaft 21 to the tumbler gear mechanism through the aforesaid worm 31 meshing with the worm gear 68 on the end of the tumbler mechanism drive shaft 46. To transmit the power from the tumbler gear mechanism to feed the work table 69 or other part coöperating with the tool, the driven shaft 48 of said mechanism may be extended out beyond one side of the casing 40 to receive a bevel gear 70 meshing with a bevel gear 71 on a short shaft 72 mounted in a hanger 73 depending from the bearing bracket 29, the other end of said short shaft having a universal connection with an ordinary extensible or telescoping shaft 74, the other end of said extensible shaft being similarly connected to a short shaft 75 mounted in the work table bed 76 to feed the usual work table 69, the detail of which it is not necessary to show herein.

It is desirable in milling machines to connect the spindle and work feed operating mechanism, so that in case of mishap the spindle and work feed will stop simultaneously to prevent said work from feeding on against the stationary tool to injure the latter or mutilate the work. In thus operating the work table feed from the pulleys which are used to guide the belt for driving the tool spindle the work table and spindle will stop at the same time and there will be a coöperation between the two, the power transmitted to the work table being directly proportioned to the power for driving the spindle. The belt riding high on the cone guide pulleys will press the driving disks against the driven disk, it being apparent that if increased power be necessary to operate the tool spindle, the belt will act automatically with increased and proportionate power on the cone guide pulleys and transmit the increased power to the work feed.

Having described one embodiment of the invention without limiting the same thereto what I claim as new and desire to secure by Letters Patent is:—

1. A machine of the class described comprising, in combination, a support; rotative means coöperating therewith; frictionally engaging driving and driven elements; means for driving said rotative means and elements whereby the power transmitted through said driving element tends to thrust the same axially to maintain said elements in frictional engagement; and means for transmitting power from said driven element to said support.

2. A machine of the class described comprising, in combination, a support; rotative means coöperating therewith; frictionally engaging driving and driven elements; a belt for driving said rotative means and said driving element, said belt and element being arranged to thrust the latter automatically axially into frictional engagement with said driven element; and means to transmit power from the latter to said support.

3. A machine of the class described comprising, in combination, rotative means; a support in coöperative relation therewith; frictionally engaging driving and driven elements having obliquely related axes; means for rotating said rotative means and said driving element and adapted through the obliquity of the axes of said elements to press the latter into engaging contact; and means for transmitting power from said driven element to said support.

4. A machine of the class described comprising, in combination, a support; rotative means coöperating therewith; a driving pulley for the latter; a belt for transmitting power from said driving pulley to said rotative means; and means for transmitting power from said belt to said support, comprising a pulley driven by said belt, a frictional element rotative with said pulley, a driven element in engagement with said friction element and operatively connected with said support, said pulley, belt and elements being arranged to cause axial movement of one of said elements to press the latter into frictional engagement with the other element.

5. A machine of the class described comprising, in combination, a support; rotative means coöperating therewith; a driving pulley for the latter; a belt connecting said pulley and rotative means; and means for transmitting power from said belt to said support, comprising a pulley having a pitched surface, a frictional element rotative therewith, and a driven element in engagement with and adjustable along the face of said first named element and operatively connected with said support.

6. A machine of the class described comprising, in combination, a support; rotative means coöperating therewith; a driving pulley; a belt for transmitting power from said pulley to said rotative means; and means to transmit power from said belt to said support, comprising opposed pulleys driven by said belt, frictional elements rotative therewith; a common element frictionally engaging said opposed elements and operatively connected with said support, said belt and pulleys being arranged automatically to thrust the latter axially toward one another and into engagement with said common element.

7. A machine of the class described comprising, in combination, a support; rotative means coöperating therewith; means to drive the latter; and means to transmit power from said driving means to said support including frictionally engaging rotative elements thrust into engagement with one another by a force proportional to the load on said driving means.

8. A machine of the class described comprising, in combination, a work support; a spindle coöperating therewith; a driving pulley for the latter; a belt for transmitting power from said driving pulley to said spindle; a pulley for guiding said belt in its run from said driving pulley to said spindle; a friction disk rotative with said guide pulley; a driven disk in frictional engagement with said pulley driven disk, said pulley, belt and disks being arranged automatically to thrust said disks into frictional engagement; and means to transmit power from said driven disk to said work support.

9. A machine of the class described comprising, in combination, a work support; a spindle coöperating therewith; a driving pulley; a belt for transmitting the drive from said pulley to said spindle; and means for transmitting power from said belt to said work support, comprising a pulley driven by said belt, a frictional element rotative with said pulley, a frictional element driven by said first mentioned element and adjustable with respect thereto, whereby to transmit a variety of speeds to said support, said pulley, belt and elements being arranged automatically to thrust said elements into frictional engagement; adjustable means having a plurality of fixed speeds and connections from said driven element to said means whereby to provide any desirable gradation of speed adjustment between the fixed speeds of said means.

10. A machine of the class described comprising, in combination, a work support; a spindle coöperating therewith; a driving pulley; a belt extending from the latter to said spindle; a pulley for guiding said belt from said driving pulley to said spindle; frictional elements driven by said guide pulley, said belt, pulley and elements being arranged automatically to thrust said elements into frictional engagement; and means to transmit power from one of said elements to said support.

11. A machine of the class described comprising, in combination, a support; rotative means coöperating therewith; frictionally engaging driving and driven elements; driving means for said rotative means and elements, constructed and arranged to thrust said driving element automatically axially into frictional engagement with said driven element; and means extending from said driven element to said support for transmitting power to the latter, including means adjustable to provide a plurality of fixed speeds; said driven and driving frictional elements being relatively adjustable, whereby to provide any desired nicety of speed gradation between the fixed speeds of said adjustable means.

12. A machine of the class described comprising, in combination, rotative means; a support in coöperative relation therewith; and means for transmitting power to the latter comprising a belt for driving said rotative means, guiding means causing said belt to tend to pursue a predetermined path, a pulley tending to divert said belt from its path and pressed axially thereby; a driven element; a driving element rotated by said pulley and pressed thereby into frictional engagement with said driven element; and transmission means extending from said driven element to said support.

13. A machine of the class described comprising, in combination, rotative means; a support coöperating therewith; and means to transmit power to said support comprising a belt for driving said rotative means, means to cause said belt to tend to pursue a predetermined path; opposed pulleys constructed and arranged relatively to said belt to tend to divert said belt from its path, said pulleys being pressed automatically axially by said belt; a driven element; driving elements rotated by said pulleys and pressed thereby into frictional engagement with said driven element and transmission means extending from said driven element to said support.

14. A machine of the class described comprising, in combination, a driven pulley; a support coöperating therewith; and means for driving said pulley and transmitting power to said support comprising a driving pulley, a belt extending from said driving to said driven pulley, a guide pulley for said belt having its axis tilted away from said driving and driven pulleys, a driving element rotated by said guide pulley, a driven element, said belt and guide pulley being constructed and arranged to automatically move the latter axially and press said driving element into frictional engagement with said driven element; and transmission means extending from the latter to said support.

In testimony whereof, I have signed my name to this specification, in the presence of two subscribing witnesses.

JOHN BECKER.

Witnesses:
EVERETT S. EMERY,
ROBERT H. KAMMLER.